Aug. 21, 1956　　　C. F. KETTERING ET AL　　　2,760,023
HUMIDISTAT

Filed Sept. 26, 1951　　　　　　　　　　　　　　　　2 Sheets-Sheet 1

INVENTORS
Charles F. Kettering,
Reino E. Schvonen &
Thomas C. VanDegrift
BY Willits, Helwig & Baillio
ATTORNEYS Aug. 21, 1956

C. F. KETTERING ET AL 2,760,023

HUMIDISTAT

Filed Sept. 26, 1951

INVENTORS
Charles F. Kettering,
Kauno E. Sihvonen &
Thomas C. Van Degrift

BY Willits, Helmig & Baillio

ATTORNEYS

United States Patent Office 2,760,023
Patented Aug. 21, 1956

2,760,023
HUMIDISTAT

Charles F. Kettering, Kaumo E. Sihvonen, and Thomas C. Van Degrift, Detroit, Mich., assignors to General Motors Corporation, Detroit, Mich., a corporation of Delaware Application September 26, 1951, Serial No. 248,324

7 Claims. (Cl. 200—61.06)

This invention relates to control means which is responsive to humidity changes and which is used to control apparatus for maintaining the moisture content of air at a desired predetermined amount within a prescribed enclosure.

It is an object of our invention to provide a new and novel hygrostat to maintain constant a desired humidity at a given temperature.

It is a further object of our invention to provide a new and novel hygrostat which will maintain a desired relative humidity.

It is a further object of our invention to provide a simple and rugged humidity sensitive control device.

With these and other objects in view which will become apparent as the specification proceeds, our invention will be best understood by reference to the following specification and claims and the illustrations in the accompanying drawings, in which:

In general our invention consists in utilizing a stack or axial assembly of discs made from some material which, as the moisture content changes, will vary in overall length to operate switching means such, for example, as paper.

Figure 1:
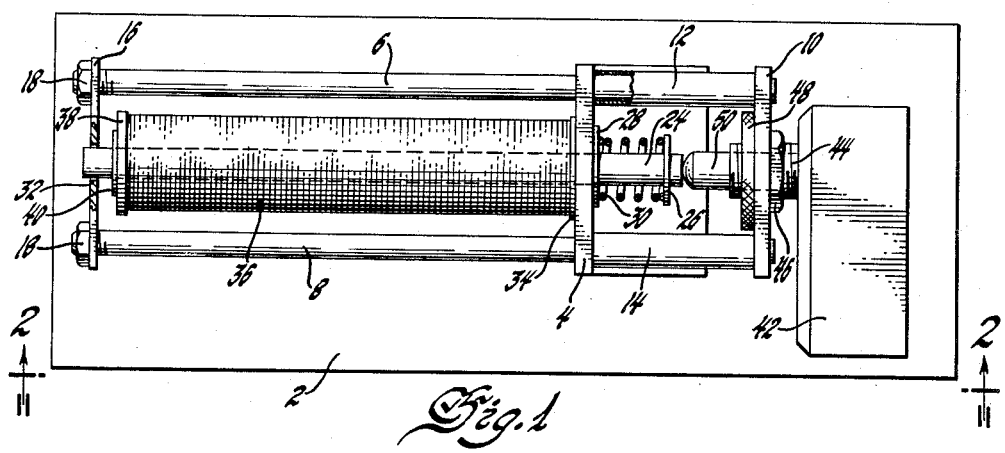
Figure 1 is a top plan view of a hygrostat embodying our invention, parts being broken away and shown in section.
Figure 2:
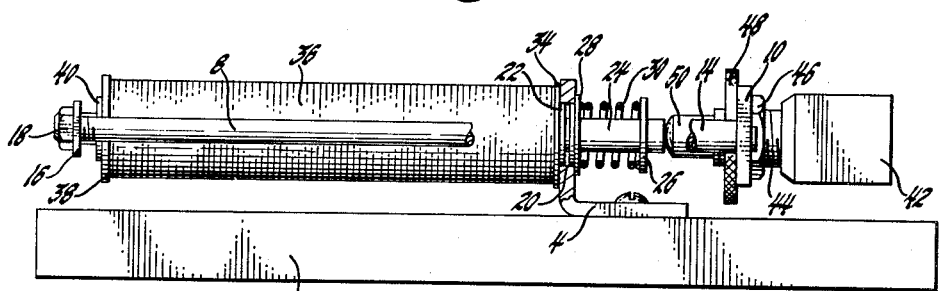
Figure 2 is a side elevation of the apparatus shown in Figure 1 taken on the line 2—2 of Figure 1, parts being shown in section.

Referring particularly to Figures 1 and 2, there is shown a base or support 2 to which is secured an upstanding bracket 4 upon which the apparatus is mounted. Two parallel rods 6 and 8 extend through opposite sides of the bracket 4 and are secured at one end to a cross member 10 in any suitable manner. Spacer sleeves 12 and 14 are mounted over that portion of rods 6 and 8 between the bracket 4 and the cross member 10 to provide proper spacing. The ends of the rods 6 and 8 which extend to the left as shown in Figure 1 are threaded and a second cross member 16 is mounted thereon, secured by nuts 18. This forms a floating supporting frame or cradle for the humidity sensitive member and switch.

The bracket 4 has an opening 20 at its center within which are mounted discs 22 having central apertures which act as bearing members for an axially movable shaft 24. A collar 26 is firmly secured adjacent the right-hand end of shaft 24. A second collar 28 is loosely mounted on shaft 24 and acts as a radial bearing surface for a coil spring 30 mounted on the shaft 24 between collars 26 and 28 holding the collar 28 against the face of the bracket 4 and biasing the shaft toward the right.

Shaft 24 extends to the left of bracket 4 for some distance and projects through an opening 32 in the cross member 16. This fit is loose and the cross member merely acts as a support. A large washer 34 is mounted on the shaft 24 just to the left of the bracket 4 and a series of stacked discs 36 of a material whose size is affected by moisture are mounted on shaft 24 between washer 34 and a spaced washer 38 adjacent the left end. The washer 38 is maintained in place by a locking collar 40 fixedly secured to the shaft 24.

As an example of a material that can be used for the discs 36 we have found that paper is satisfactory. This is, however, not to be taken in a limiting sense as there are other materials that will serve. One type of paper that operates satisfactorily is filter paper, since it has high absorbent qualities.

With the assembly of the moisture conscious discs as shown, the spring 30 will bias the shaft 24 toward the right and tightly clamp the stack of discs 36 between washers 34 and 38. As the discs 38 expand and contract due to changes in moisture content, the shaft 24 will be moved back and forth an amount proportionate to the humidity change.

The cross member 10 supports the switching means which is operated by movement of shaft 24. The switch is a quick snapover type which can be operated by a very small movement and which are termed microswitches. This switch is shown as a housing 42 having a cylindrical exteriorly threaded member 44 projecting from the housing and rigidly secured thereto. This member extends through an opening in the cross member 10 to support the switch and has a nut 46 threaded thereon which acts to locate the switch position with respect to the cross member. A thumb nut 48 is threaded on this cylindrical member 44 on the opposite side of the cross member 10 to clamp the same. A switch actuating plunger 50 is mounted for axial movement in the cylindrical member 44 and extends a short distance from the end thereof. It is mounted to be in alignment with the shaft 24.

With the switch 42 mounted in a given position, the expansion and contraction of the stack 36 caused by changes in the moisture content as affected by the relative humidity will actuate the switch. The relative humidity at which the switch will be opened and closed may be varied by loosening the thumb nut 48, adjusting the nut 46 to move the switch assembly toward or away from the shaft 24, depending upon whether a higher or lower relative humidity is desired to be maintained and tightening the thumb nut 48 at the new position. Each time the relative humidity increases beyond the value for which the device is set the shaft 24 will be moved to the right far enough to move plunger 50 and actuate switch 42 to energize apparatus to reduce the humidity.

Figure 3:
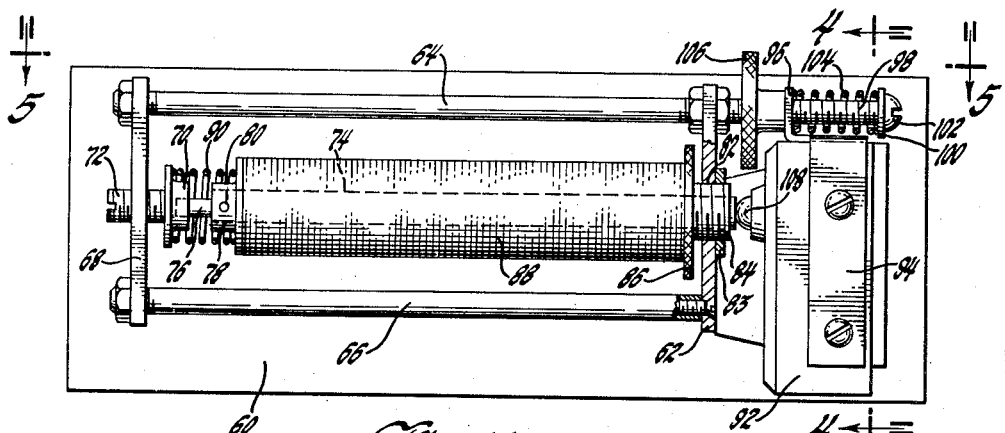
Figure 3 is a top plan view of a modified form of our invention, parts being broken away and shown in section.
Figure 4:
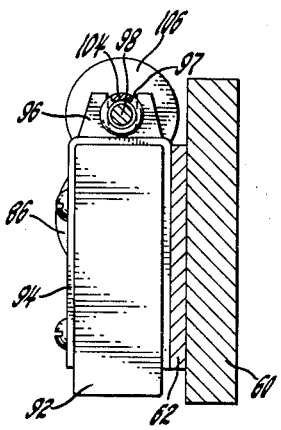
Figure 4 is a sectional view taken on the line 4—4 of Figure 3.
Figure 5:
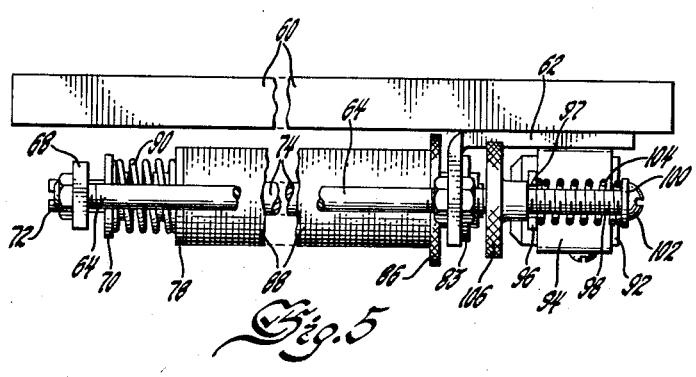
Figure 5 is a sectional view taken on the line 5—5 of Figure 3.

The form of our invention shown in Figures 3, 4 and 5 is basically the same, but provides for further adjustment of the apparatus. A base 60 carries a supporting bracket 62. To the bracket are secured a pair of parallel rods 64 and 66 lying in spaced relation to the base, the former extending on both sides of the bracket and the latter terminating at the bracket. A cross member 68 is mounted on the ends of the rods 64 and 66. A cup-shaped bearing member 70 having a short threaded shaft 72 secured to its base is mounted in a threaded opening in cross member 68.

An actuating shaft 74 has a reduced diameter end portion 76 which rides in the cup-shaped bearing 70. A flanged disc 78 is secured to the shaft 24 adjacent its change in diameter section by any suitable means such as a pin 80. The bracket 62 has a threaded opening 82 therein into which a threaded bushing 84 is screwed. A lock nut 83 is threaded onto that portion of the bushing extending through the bracket 62 for locking. A knurled flange portion 86 is secured to one end of the bushing. The stack of paper discs 88 in this instance are mounted on shaft 74 between flange 86 and flanged disc 78. A coil spring 90 is mounted around the reduced portion 76 of the shaft 74 and bears against the face of the cup-shaped bearing member 70 and the face of flanged disc 78. This loads the stack or pile of discs and biases the shaft 74 toward the right as seen in Figure 3.

The switch housing 92 has a U-shaped supporting member 94 secured around three sides thereof, one face of the switch lying against the bracket 62. An upstanding ear 96 on the base of the U-shaped member has a slotted opening 97 therein for the threaded extension 98 of the rod 64. A washer 100 is secured to the end of the rod 64 by a cap screw 102 threaded into the end and a coil spring 104 is mounted around the threaded section 98 between washer 100 and the surface of the ear 96. This biases the switch housing toward the left in Figures 3 and 5 and toward the shaft 74. A thumb screw 106 is threaded on shaft 64 to the left of the ear portion 96 to press the same against the spring bias and adjust the position of the switch with respect to the humidity sensitive means. The actuating plunger 108 of the switch engages with the end of the shaft 74 to be moved thereby.

In this form of our invention the screw 72 is initially adjusted to so load the stack of discs that they will cause switch actuation at a desired relative humidity with the thumb screw 106 in a given position. Thereafter by moving the thumb screw in either direction the device may be adjusted to cause switch operation at more or less relative humidity and if desired the side of the thumb screw may be calibrated.

Figure 6:
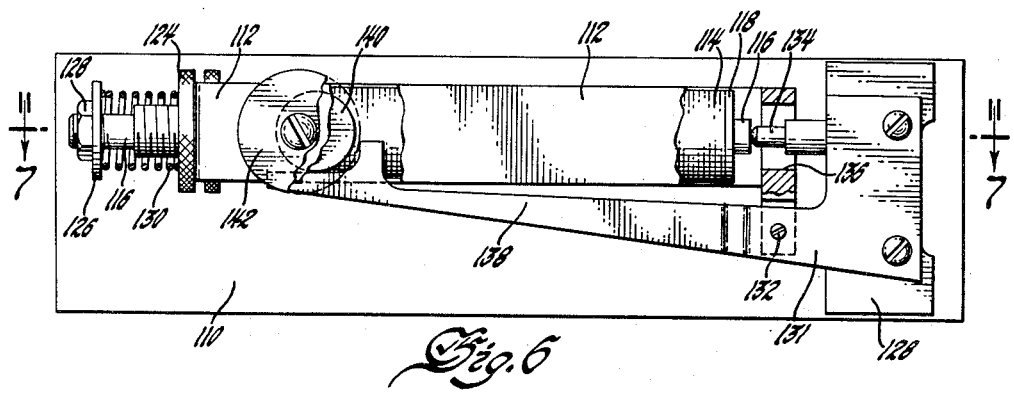
Figure 6 is a top plan view of still another modified form of our invention with parts broken away and shown in section.
Figure 7:
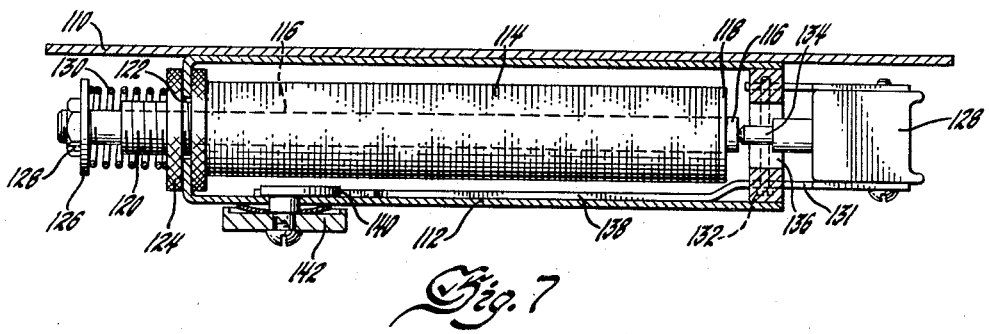
Figure 7 is a sectional view taken on the line 7—7 of Figure 6.

A third form of our invention is shown in Figures 6 and 7. A base 110 is provided to which a housing member 112 is secured by any suitable means. The hygrostatic element in this case is formed of a series of paper discs 114 mounted on an axially movable shaft 116 between a flange 118 secured adjacent one end of the same and a threaded bushing 120 in which the shaft may slide and which projects through an opening 122 in the housing 112. A lock nut 124 is threaded onto the projecting end of the bushing to hold it in place. The shaft 116 extends through said bushing and has a washer 126 secured to its end section by a nut 128. A coil spring 130 is mounted around the end of shaft 116 and engages the lock nut 124 and the washer 126 biasing the shaft 116 to the left as shown in Figures 6 and 7 and loading the stack of discs 114.

The switch housing 128 is carried on a frame 131 pivoted around a pin 132 carried by the housing. The actuating plunger 134 of the switch is aligned to engage the end of shaft 116 and projects through an opening 136 in said housing. The frame 131 has an elongated extension arm 138 which extends substantially parallel to the shaft 116 to a point adjacent an eccentric cam 140 carried by circular disc 142 rotatably mounted on the housing. Thus as the disc 142 is rotated the arm 138 will be moved by the eccentric 140. Since the pivotal axis of the frame is to one side of the shaft, the actuating plunger of the switch will be moved axially with respect to the shaft end as the frame pivots. The disc 142 may be graduated in relative humidity if desired. The adjustment of the coil spring 130 gives the initial setting and the rotation of the disc 142 changes the setting to differing degrees of relative humidity that may be desired.

We claim:

1. In a hygrostat, a support, a shaft mounted thereon for axial movement, a member fixed to said shaft, a plurality of discs mounted on said shaft in face-to-face relation of material whose dimensions vary with a change in moisture content, means for clamping the discs between the member rigidly fixed to the shaft and a portion of the support so that dimensional variations in the discs caused by variations in moisture will move the shaft axially, means to vary the clamping pressure to adjust for predetermined points of operation, unitary switching means mounted on the support having an operating member engaging one end of the shaft and actuated by the shaft movement and means for adjusting the position of the unitary switching means on the base for setting purposes.

2. In a hygrostat, a support, a shaft mounted thereon for axial movement, a flange rigidly secured to the shaft adjacent one end, a plurality of paper discs mounted on said shaft between the flange and the support, spring biasing means between the shaft and support to load the paper discs with a desired pressure, a pivotal carriage mounted on said support engaging the shaft to be actuated by movement thereof and adjustable cam means on said support engaging the carriage to adjust the position thereof.

3. In a hygrostat, a support, a shaft mounted thereon for axial movement, a flange rigidly secured to the shaft adjacent one end, a plurality of paper discs mounted on said shaft between the flange and the support, adjustable spring biasing means between the shaft and support to initially load the paper discs, unitary switching means having an operating member engageable with the shaft, and adjustable means for mounting said unitary switching means on said support so that its actuation level may be varied.

4. In a hygrostat, a support, a shaft mounted on said support for axial movement, biasing means connected to both the support and the shaft urging the latter in one direction, a stack of paper discs mounted on said shaft and loaded by the biasing means, means for adjusting the biasing means to provide different loading on said discs and unitary switching means adjustably mounted on the support and having an operating member aligned and engageable with the shaft so that axial movement will actuate the switching means.

5. In a hygrostat, a support, a shaft mounted on said support for axial movement, biasing means connected to both the support and the shaft urging the latter in one direction, a stack of paper discs mounted on said shaft and loaded by the biasing means, adjustable means for changing the loading on said discs, switching means engageable with said shaft and threaded means for mounting said switching means on the support so that it can be adjusted with respect to the shaft to vary the point of operation.

6. In a hygrostat, a support, a shaft mounted for axial movement on said support, humidity sensitive means engaging said shaft and moving it axially upon changes in relative humidity, a carriage pivotally mounted on said support, switching means mounted on said carriage adjacent the end of the shaft and engageable therewith for operation, and means for independently adjusting the position of the pivotally movable carriage.

7. In a hygrostat, a support, a shaft mounted for axial movement on said support, humidity sensitive means engaging said shaft and moving it axially upon changes in relative humidity, a carriage pivotally mounted on said support, switching means mounted on said carriage adjacent the end of the shaft and engageable therewith for operation, and means for independently adjusting the position of the pivotally movable carriage, said last-named means including a cam rotatably mounted on said support engageable with a portion of the carriage to cause pivotal movement of the same upon cam rotation.

References Cited in the file of this patent

UNITED STATES PATENTS

| | | |
|---|---|---|
| 1,271,666 | Charters | July 9, 1918 |
| 1,772,611 | Lewis | Aug. 12, 1930 |
| 1,903,745 | Lawler | Apr. 11, 1933 |
| 1,965,705 | Lamlein et al. | July 10, 1934 |
| 1,995,430 | Lewis | Mar. 26, 1935 |
| 2,281,986 | Nolan | May 5, 1942 |